United States Patent [19]

Marchand

[11] 3,897,188

[45] July 29, 1975

[54] VOLUMETRIC DIVIDER FOR PASTE, ESPECIALLY FOR DOUGH PASTE

[76] Inventor: Georges Aimé Marchand, 16, rue Mac-Mahon, Rueil-Malmaison, Hauts de Seine, France

[22] Filed: Sept. 24, 1973

[21] Appl. No.: 399,700

[30] Foreign Application Priority Data
Mar. 29, 1973 France ............... 73.1147

[52] U.S. Cl. .................. 425/238; 425/DIG. 60
[51] Int. Cl.² ............................. A21C 5/00
[58] Field of Search ........ 425/238, 405 R, DIG. 60, 425/103, 447

[56] References Cited
UNITED STATES PATENTS

| | | | |
|---|---|---|---|
| 1,704,903 | 3/1929 | Russell | 425/103 |
| 2,178,406 | 10/1939 | Rhodes | 425/239 |
| 2,638,066 | 5/1953 | De Ridder | 425/238 |
| 3,279,936 | 10/1966 | Forestek | 425/DIG. 55 |
| 3,349,438 | 10/1967 | Baker et al. | 425/238 X |
| 3,485,187 | 12/1969 | Benier | 425/238 |
| 3,561,372 | 2/1971 | Vogt | 425/405 R X |

Primary Examiner—Francis S. Husar
Assistant Examiner—David S. Safran

[57] ABSTRACT

The dividing machine comprises a dough housing (9) having an outlet controlled by a shutter-cutter (21) and placed upright a mobile dividing head (34) delimiting at least one alveolus (35) supported by a driving mechanism (46–50) and containing a free piston (66) extended by a rod (65) designed to cooperate with an adjustable mobile stop (56) determining the relative low position of the piston in the alveole placed in filling position under the housing.

10 Claims, 4 Drawing Figures

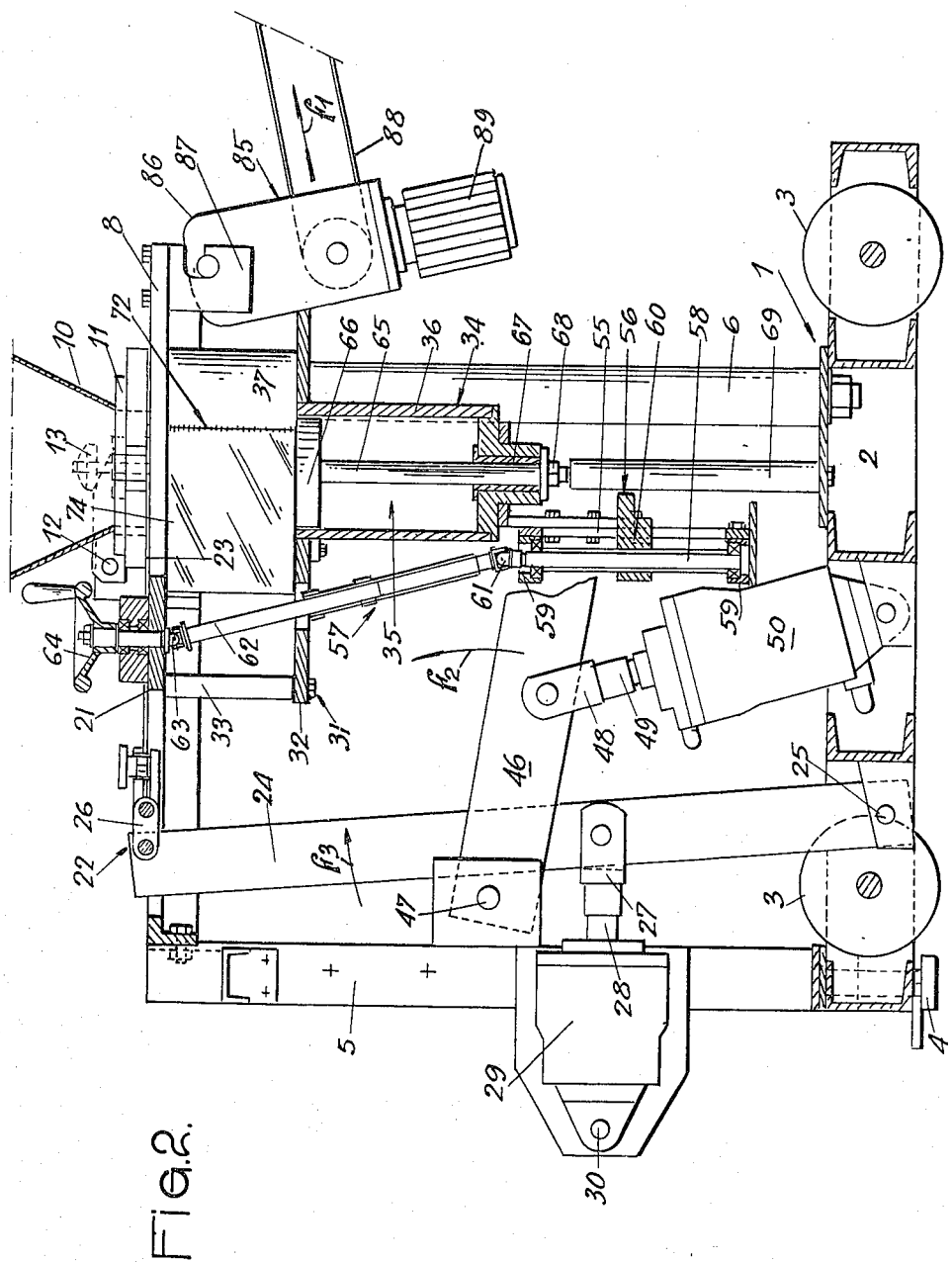

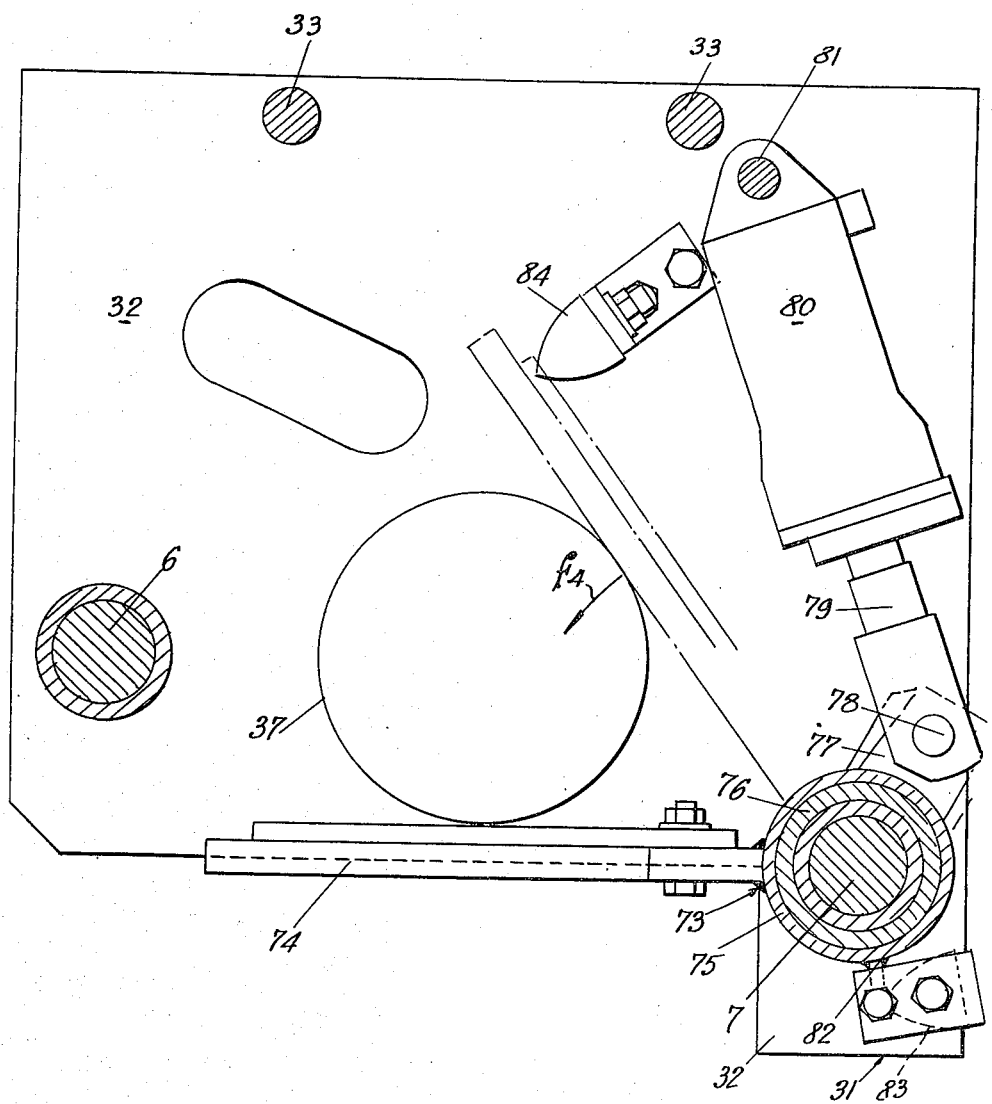

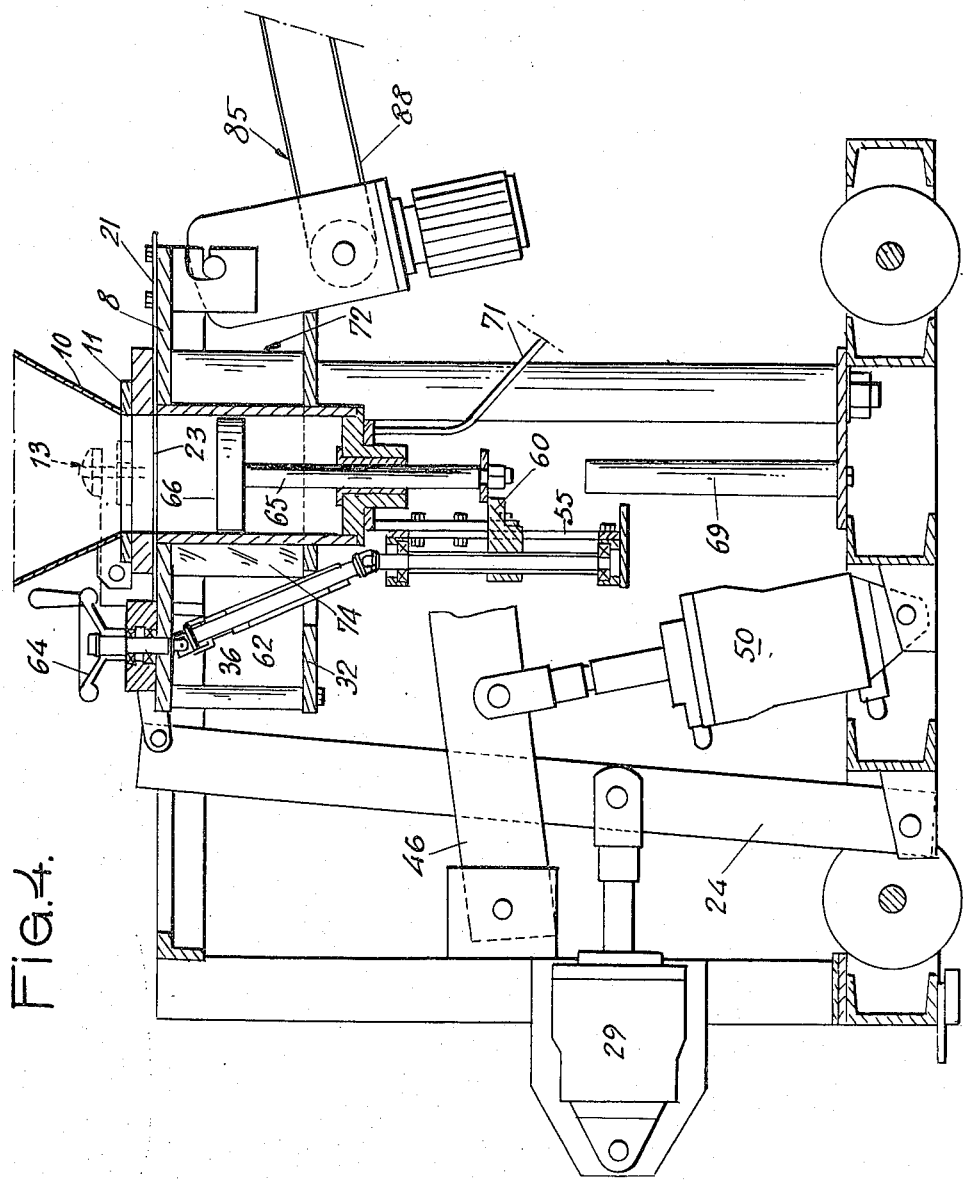

VOLUMETRIC DIVIDER FOR PASTE, ESPECIALLY FOR DOUGH PASTE

The present invention relates to means embodied to perform the dividing operation of masses of kneaded dough to provide dividing-up thereof before baking.

Dividing-up the mass of kneaded dough has been first realized by hand from a ponderal reference. To increase the work rate and reduce the worker weariness, dividing machines have been proposed said machines being possibly of various types.

The standard dividing machines, which are generally better adapted to the work of small exploitations, have the disadvantage to require an additional intermediate weighing operation and also an adequate material to make a predetermined mass of dough corresponding to the capacity of the machine in which said weighed mass is introduced to stand a dividing operation according to a restricted number of possibilities.

The volumetric dividing machines provide to cancel the material of the intermediate weighing operation but have the main disadvantage, especially for fast work rates, to produce portions of dough which are not always complying with the prescribed weight limits. On the other hand, said machines have also the disadvantage to submit the kneaded dough to restraints or to a heating especially bad for the further development of the rising step.

The present invention copes with the above mentioned disadvantages by creating a new volumetric dividing machine having the advantage not to restraint the dough any longer upon the dividing process and to give the user a variable work rate providing said machine to be utilized in small, average sized, or big exploitations.

The object of the invention is besides designed to be of a simple and convenient utilization, requiring little maintenance.

According to the invention, the dividing machine comprises a housing for the dough to be divided, outlet of said housing being controlled by a shutter-cutter and placed upright of a mobile dividing head delimiting at least one alveole and supported by a driving mechanism having a reciprocate vertical motion relatively to the housing, said alveolus having a useful volume connected to a vacuum chamber and containing a free piston extended by a rod designed to cooperate, on one hand, with a fixed stop determining a low rest position for said piston and, on the other hand, with an adjustable mobile stop determining a relative low position for the piston inside the alveolus which is brought in filling position under the housing by moving inside a clearing out passage containing a mechanism transferring portions of divided dough towards a loading conveyor.

Various other characteristics of invention are moreover shown in the following detailed description.

An embodiment of the invention is shown by way of non-restrictive example in the accompanying drawings.

FIG. 2 is a side elevational section view, taken substantially along line II—II of FIG. 1.

FIG. 3 is an enlarged sectional view, taken along line III—III of FIG. 2.

FIG. 4 is a side elevational section view similar to FIG. 2, and showing the dividing machine in another characteristic of operation.

Figure 1:
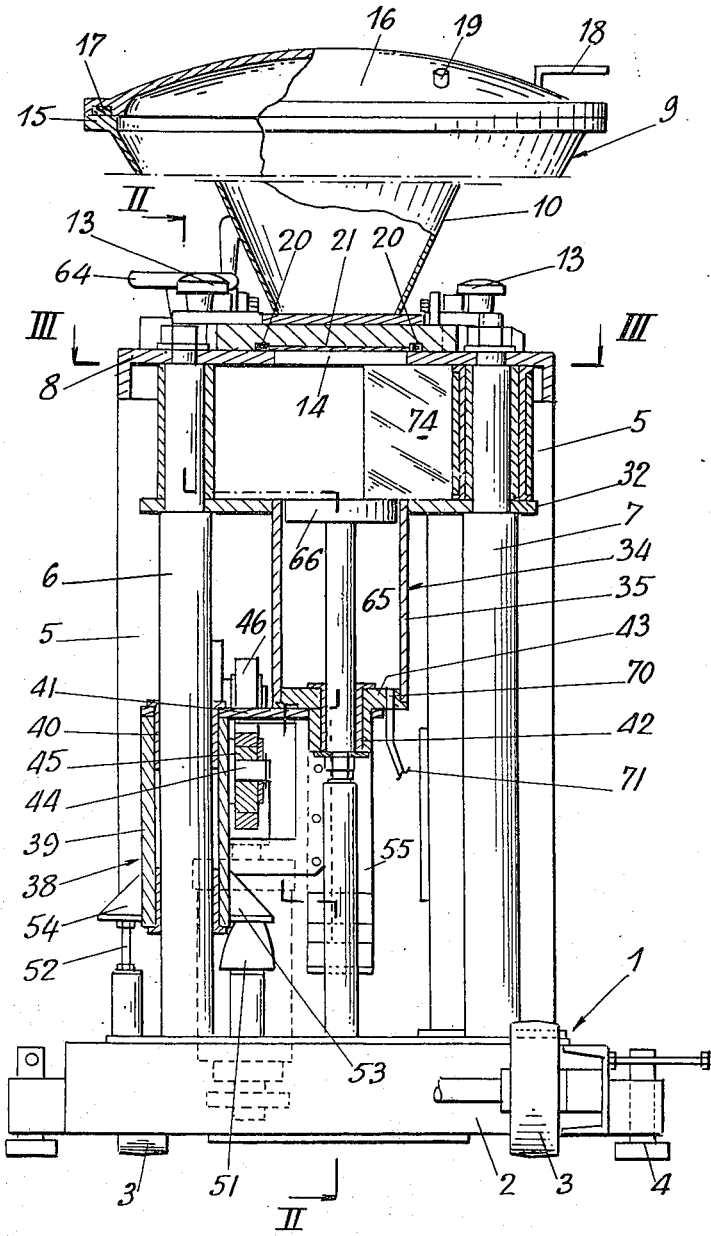
FIG. 1 is an elevational section view, partly exploded, of the dividing machine according to this present invention.

According to FIGS. 1 and 2, the volumetric dividing machine comprises a frame 1 formed by a base 2 provided with roller means 3 and with balance-adjusting jacks 4. The base 2 supports, by members 5 and cylindrical columns 6 and 7, an upper table 8 whereon is placed a housing 9 for the dough. Said housing is composed of a funnel 10, substantially in the shape of a reverse cone, provided with a bed-plate 11 pivotally mounted through horizontal spindle 12 on the table 8. The connection between the table and the funnel 10 is provided through removable fixing means 13 to keep the funnel 10 in such a position that the aperture of its bed-plate is in coincidence with a hole 14 of the table 8. The larger base of the funnel 10 forms a flange 15 on which can be placed a cover 16 which is preferably a tight closing cover. For that purpose, the peripheral edge of the cover 16 is provided with an inflatable seal joint 17 which can be connected to a production source or feeding network of compressed air, which may also be directed to the inside of the funnel by an inlet tube 18 placed on the cover 16 in the vicinity of a release valve 19. Though it has not be represented, the cover 16 is connected to the funnel 10 by a hinge which may be connected to a mass compensating mechanism.

The table 8 supports sliding bars 20 designed for guiding a shutter-cutter 21, preferably constituted by a blade in the shape of a slide going through the bed-plate 11. The blade 21 shows, opposite a driving mechanism 22, a circular hole 23 with a cutting edge having a diameter which is substantially equal to the small base of the funnel 10 and to the aperture 14 of the table 8. The driving mechanism 22 is constituted by a lever 24 which is pivotally mounted through a spindle 25 on the base 2 and connected through on or several cranks 26 to the armature of the blade 21. The lever 24 is connected between the cranks 26 and the spindle 25 to the clevis 27 of the piston rod 28 of a jack 29, of the double effect pneumatic type, pivotally mounted through a spindle 30 on the frame 1 opposite the columns 6 and 7.

The table 8 extends above and in parallel with a counter-table 31 constituted by a plate 32 held by the columns 6 and 7 and by holding ties 33. The plate 32 constitutes a guiding means for a dividing head 34 movable on a reciprocate vertical motion. In the present embodiment, the dividing head 34 is constituted of a single alveolus 35 formed by a cylinder 36 placed to have a free vertical slide motion into a guiding aperture 37 provided on the plate 32 in coincidence with the aperture 14 of the table 8. It is well obvious that the dividing head 34 could be differently made and have a plurality of alveoli formed by housings inside a same block or still delimited by independent cylinders. In such a case, the element 21 is formed by one or several blades realized to control the passage section between the funnel 10 and the alveoles.

In the present embodiment, the cylinder 36 is supported by a mobile carriage 38 constituted by a sliding bar 39, for example of the cylindrical type, placed by means of rings 40 on the column 6. The sliding bar 39 is associated to a bracket 41 having a horizontal portion for centering and supporting the tubular extension 42 of the fixed bottom 43 of the cylinder 36. The slide bar 39 is, on the other hand, connected by a swivel-pin 44 to a block 45 which can slide into an aperture delimited at the end of an operating lever 46. The lever 46 is hinged on the members 5 by a spindle 47 and supports, in its substantially median portion, the clevis 48 of the piston rod 49 of a double effect pneumatic jack 50 pivotally mounted on the base 2. Said base supports a damping device 51 and an adjustable stop 52 designed to cooperate with lugs 53 and 54 of the sliding bar 39 to determine the extremely low position of said sliding bar on the column 6.

The vertical portion of the bracket 41 supports a sliding bar 55 for guiding a mobile stop 56 associated to an adjusting mechanism 57. Said mechanism is formed of a threaded rod 58 mounted through rollers 59 on the sliding bar 55 which provides a guiding for a tapped finger 60 screwed on the rod 58. A ball-and-socket joint 61 provides the connection between the upper end of the threaded rod 58 and a telescopic shaft 62 passing through the plate 32 beyond which it is connected by a ball-and-socket joint 63 to an operational wheel 64 supported by the table 8. The finger 60 has a length so determined as to be placed on the way of the rod 65 of a piston 66 freely mounted inside the cylinder 36. The rod 65 is guided by a ring 67 into the tubular extension 42 of the bottom 43 beyond which it is provided with an adjustable stop 68 designed to cooperate with a pillar 69 rising from the base 2. For some reasons which will appear hereinbelow, the piston 66 has, in relation with the inner diameter of the cylinder 36, some clearance, for example within the range of 0.1 to 0.2 mm. The piston 66 may be made of a material known in the trade under the trademark "CESTIDUR" (a French trademark registered May 15, 1969 under No. 751,935) and which is an upper molecular weight stearine filled polyethylene. The fixed bottom 43 of the cylinder 36 is crossed by a junction 70 connected through a flexible pipe 71 to a vacuum source, for example composed of a vacuum static ejector.

The plate 32 and the table 8 delimit between them, a passage 72 for the clearing out the portions of divided dough. The passage 72 contains, as it appears in FIG. 3, an ejector 73 constituted by a blade 74 extending vertically between the plate 32 and the table 8 on a height substantially equal to that of the passage 72. The blade 74 is fixed to a tubular bearing which is placed on the column 7 by means of rings 76. The tubular bearing 75 comprises a first radial lug 77 which is connected through a spindle 78 to the piston rod 79 of a double effect pneumatic jack 80 pivotally mounted on the plate 32 through a spindle 81. The tubular bearing 75 forms a second radial lug 82 designed to cooperate with a damping stop 83, for example formed by a block of rubber, fixed on the plate 32 opposite a second similar stop 84 placed between the jack 80 and the blade 74. The clearing out passage 72 is associated to a receiver-conveyor device 85 constituted by an armature 86 able to be removably placed on the frame 1, since it is for example hanging from lugs 87. The armature 86 supports an endless belt conveyor 88 of which the driving motion in direction of arrow $f_1$ is made by a self contained moto-reducer set 89 fixed on or supported by the armature 86.

Before the operation, the volumetric dividing machine, described in the above disclosure, must be adjusted in a certain number of points which are the following:

At least one of the stops 84 or 83 must be adjusted to limit the active angular range of the blade 74 in function of the stroke which is required to provide, as hereinbelow described, the clearing out of each portion of divided dough.

The stop 68 is also adjusted for the upper face of the piston 66 to exactly flush with the upper side of the plate 32. Said adjustment determines the low rest position practically reached by the piston 66 and, consequently, the maximal theoritical cubic capacity of the alveolus 35 brought in filling position by a vertical upwards motion up to the table 8. From such a maximal theoritical cubic capacity, it is obvious that the weight of a portion of dough filling completely the alveolus thus utilized will be a function of its own density. According to said density, it is consequently necessary to adjust the low working position of the piston 66 in function of the weight of each portion of divided dough. Said adjustment is made through the wheel 64 which is moved in one or in another direction to raise of to lower the finger 60 of the stop 56 relatively to the lower end of the rod 65 of the piston 66. Said operation is performed during the rest state illustrated in FIG. 2 and has no immediate influence on the steady rest position of the piston 68 which is normally maintained by its own weight against the pillar 69.

To embody the volumetric dividing machine, first is performed the filling of the housing 9 with kneaded dough which is sent through gravity into the funnel 10, the small base of which is closed by the blade 21. The cover 16 is then tightly set on the flange 15, then compressed air, delivered at a pressure higher of 0.1 to 0.5 bar to that of the ambient medium, is introduced into the housing 9 after inflating the seal joint 17. Before starting the operation cycle, the cylinder 36 is connected in an effective way to the vacuum source connected by the flexible pipe 71 to create in the alveolus 35 a partial vacuum within the range of 0.7 to 0.9 bar. In such a state, the dividing machine can be controlled in automatic operation having the following cycle:

The compressed air, constituting the energy consumed by the dividing machine, is directed towards the jack 50 which controls, by the extension of the rod 49, swivelling of the lever 46 in direction of the arrow $f_2$. It results therefrom the raising of the carriage 38 which causes the upwards motion of the dividing head 34, under the circumstance that of the cylinder 36, and the withdrawal of the telescopic shaft 62. During said motion, the partial vacuum in the alveolus 35 and also the mass of the piston 66 cause said piston to be held in its low rest position determined by the pillar 69. The relative motion of the cylinder 36 goes on until the moment when the finger 60 of the mobile stop 56 is brought in contact with the lower end of the rod 65. From that raising step, the upwards motion caused by the lever 46 is simultaneously transferred to the cylinder 36 and to the piston 66 up to the stop position corresponding to the engagement of cylinder 36 in the hole 14 of the table 8. Said stop position, illustrated in FIG. 4, shows that the previous adjustment of the mobile stop 56 determines the low active position of the piston in the cylinder 36 which thus has useful cubic capacity selected in function of the mass of the portion of dough having to be obtained.

The end of the stroke of the lever 46 controls feeding of the jack 29 in charge of moving the lever 24 in direction of the arrow $f_3$ to make the blade 21 to slide between the slide-bars 20 and bring the hole 23, of which it is provided, in coincidence with the small base of the funnel 10 and with the aperture 14. The pressure into the housing 9 gives a push to the dough which simultaneously is sucked-in by the partial vacuum in the alveolus 35. In fact, the constructive clearance designed between the piston 66 and the cylinder 36 permits the pressure in the inner volume of said cylinder to be reduced by comparison to the ambient medium, regarless of the position of the piston 66 which constitutes a mobile bottom for the cylinder 36 during the operative cycle. Preferably, the partial vacuum prevailing in the alveolus 35 is within the range of 0.7 and 0.9 bar to create a sucking-in effect of the dough which is higher than the pressure effect resulting from the push developed inside the housing 9. The filling time of the useful volume of the alveolus 35 is determined by a timer which is then responsible to reverse the feeding of the jack 29 to ensure through the lever 24 the return stroke of the blade 21 into the closing position for the small base of the funnel 10. The return stroke of the blade 21 to its original position causes the cutting of the portion of dough introduced in the useful volume of the alveolus 35. The return stroke of the jack 29 to the position represented in FIG. 2 reverses feeding of the jack 50 which has to control, through the lever 46, the downwards vertical motion of the carriage 38 and of the dividing head 34 causing the extension of the telescopic shaft 62. During the first step of said downwards motion, the additional mass, represented by the portion of dough introduced into the alveole 35, causes the simultaneous motion of the piston 66 up to the moment when said piston comes again to the low rest position by direct contact of the rod 65 on the pillar 69. The downwards motion is then only transmitted to the cylinder 36 of which the relative lowering in relation with the piston progressively uncovers, in the passage 72, the portion of divided dough supported by said piston 66.

The return stroke of the jack 59 to its original position represented in FIG. 2 corresponds to the complete withdrawal of the cylinder 36 relatively to plate 32. This determines the feeding of the jack 80 which controls the motion of the blade 74 in direction of the arrow $f_4$ from the position represented in mixed lines in FIG. 3. The portion of dough supported by the piston 66 is thus taken in charge and moved on the plate 32 by the blade 74 up to the moment when said blade comes into contact with the resilient stop 83 submitting said blade to a strong return stroke clearing out the portion of dough so divided previously to its transfer on the conveyor 85 to be carried towards a further working station, for example constituted by a machine putting the dough in balls. The ejection of the divided dough controls the reverse feeding of the jack 80 which, then sets (when the blade 74 is back to its rest position illustrated in mixed lines in FIG. 3) a new operating cycle starting by the feeding of the jack 50.

As it appears from the the above disclosure, the invention makes possible the realization of a dividing machine with volumetric reference which can, with no difference, comprise one or several alveoli for simultaneous divisions forming together a single dividing head moved by the jack 50. It is thus possible, from identical constitutive elements, to proceed to the constitution of machines of different capacity having a great ability of adaptation in function with the effective needs of the user. Besides, each machine can also be rapidly adapted according to the needs, since just has to be set the time constant introduced by the delay timer controlling the filling time to obtain more or less fast production rates without varying the time of the other operation motions of the whole unit.

It is to be noticed that the dividing machine is formed with constitutive elements of a simple and strong conception performing only elementary motions of small amplitude. This provides to realize a complete operative cycle of a short time and consequently to obtain high production rates even with a dividing head 34 delimiting only one alveolus 35. The obtention of a high production rate is also due to the fact that the piston 66 is preferably made of the material generally known under the trademark "CESTIDUR" (a French trademark registered May 15, 1969 as No. 751,935). This material is known to have a good resistance to friction, and is surprisingly advantageous for fabricating the piston supporting the portion of divided dough, because it prevents the dough from sticking whatever may be its degree of humidity and also its composition. The utilization of such a material enables thus to obtain a fast and perfectly clean clearing-out of each portion of divided dough, not leaving any bit or piece of dough which could be prejudicial to the further filling or to the surface state having to be maintained between the piston and the cylinder to obtain a partial vacuum in the cylinder above the piston.

To get similar beneficial conditions at the level of the ejector 73, the blade 74 can also be fabricated either integrally or locally of "CESTIDUR" (a French trademark registered May 15, 1969 as No. 751,935).

Another advantage of the volumetric dividing machine of this invention is to provide a practical and easy adjustment of the weight of the portions of divided dough in function of the density. Actually, the mobile stop 56 has just to be moved by means of the wheel 64 to vary the relative low position of the pistion 66 inside the cylinder 36 in filling state, and thus modify the practical cubic capacity of the alvelus 35.

An additional advantage is due to the fact that the operational principle of the dividing machine provides to obtain the transfer by depression of the dough to be divided with an effect of discharge by overpressure, which cancels any mechanical or heat restraint caused to the dough to be divided which thus keep constant characteristics favorable for the further rising step. Besides, it is to be noticed that all the mobile components of the dividing machine are operated with only one power source, that is the compressed air which is also utilized to transfer the dough to be divided to the inside of each alveolus. Besides the electrical power required for feeding the control components, the practical embodiment of the volumetric dividing machine does only require one connection to a production or distribution power source with no direct danger for the user.

In the above disclosure, it has been mentioned that the operation of the volumetric dividing machine starts after the putting up in pressure of the housing 9 and putting up under relative depression of the alveolus or alveoli 35. According to the plasticity of the dough and also the thresholds of pressure which can be utilized, it can be expected to operate the dividing machine only by embodying the relative partial vacuum at the level of each alveolus 35.

Though it has not been represented, it is to be noticed that the blade 74 can be associated to an antisticky device more especially utilized in the case of soft dough in a very humid place. Said device comprises a blowing tube fed with air having bubbled into vegetable oil. The blowing tube thus realizes the projection on the blade 74 of a very fine atomization with fatty characteristics sufficient to prevent any sticking of the dough during the ejection.

This present invention is not restricted to the embodiment shown and described in detail, for various modifications can moreover be applied thereto without departing from the scope of the invention as shown in the appended claims.

I claim:
1. A machine for volumetrically dividing dough, comprising:
   a housing for the dough, said housing having an outlet;
   a shutter-cutter adjacent said outlet for controlling said outlet;
   a table supporting said housing adjacent said outlet;
   a plate spaced from and parallel to said table to form a clearing-out passage between said table and said plate;
   a mobile dividing head comprising a vertically oriented cylinder forming an alveolus for containing a predetermined volume of the dough, said cylinder being vertically movable through a hole in said plate into said clearing-out passage;
   a driving mechanism supporting said driving head and having a reciprocal vertical motion for driving said cylinder into and out of said clearing-out passage;
   a pipe for connecting said cylinder to a vacuum source;
   a free piston within said cylinder having a piston rod extending out of said cylinder;
   a fixed stop engageable with said piston rod for determining a low rest position for said piston when said cylinder is out of said clearing-out passage;
   a mobile adjustable stop coupled to said driving mechanism and engageable with said piston rod for determining the position of said piston when said cylinder is in said clearing-out passage; and
   a transfer mechanism comprising an ejector drive coupled to an ejector blade, said ejector blade being positionable within said clearing-out passage and moveable by said ejector drive, whereby a predetermined volume of dough can flow utilizing a pressure differential from the vacuum source from said housing into said alveolus when said cylinder is in said clearing-out passage and said dough can be transferred from between said clearing-out passage to a loading conveyor by said ejector blade when said cylinder is out of said clear-out passage.

2. The machine as claimed in claim 1, wherein the upper face of said piston is flush with the upper face of said plate extending parallel under said table when said piston is in said low rest position.

3. The machine as claimed in claim 1, including a cover tightly closing said housing and an inlet tube connectable to a pneumatic pressure source, whereby the dough in said housing can be pressurized.

4. The machine as claimed in claim 1, wherein said pipe is connected to the bottom of said cylinder and said piston has a diameter less than the diameter of said cylinder so that a space exists between said piston and said cylinder, whereby said vacuum source can produce a partial vacuum in the alveolus above the piston.

5. The machine as claimed in claim 1, wherein said driving mechanism comprises:
   a frame having a vertical column;
   a carriage sliding on said column and coupled to said cylinder;
   a hinged lever coupled to said carriage; and
   a double acting pneumatic jack coupled to said hinged lever, whereby said jack drives said cylinder by said reciprocal vertical motion.

6. The machine as claimed in claim 5, wherein said mobile adjustable stop comprises:
   a screw threaded rod carried by said carriage;
   a tapped finger screwed on said threaded rod, said tapped finger having a stop surface for abutting said piston rod;
   a telescopic shaft coupled to said threaded rod for turning said threaded rod, whereby the position of said stop surface is adjustable.

7. The machine as claimed in claim 1, wherein said piston is made from a material which does not stick to the dough.

8. The machine as claimed in claim 1, wherein said shuttercutter comprises:
   a slideable blade positioned between the base of said housing and the upper surface of said table; and
   a blade driving mechanism coupled to said slideable blade to drive it in a linear motion across said outlet, said slideable blade driving mechanism being interconnected with said head driving mechanism, whereby the motions of said slideable blade and said driving head are coordinated.

9. The machine as claimed in claim 1, wherein said injector drive is interconnected with said head driving mechanism, whereby the motions of said ejector blade and said driving head are coordinated.

10. The machine as claimed in claim 1, wherein said ejector drive includes a double acting jack and said ejector blade is made at least partly from a material which does not stick to the dough.

* * * * *